US010083195B2

(12) United States Patent
Zhou

(10) Patent No.: US 10,083,195 B2
(45) Date of Patent: Sep. 25, 2018

(54) SYSTEM AND METHOD FOR COMPOSING A MULTIDIMENSIONAL INDEX KEY IN DATA BLOCKS

(71) Applicant: Futurewei Technologies, Inc., Plano, TX (US)

(72) Inventor: Yan Zhou, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 833 days.

(21) Appl. No.: 14/261,313

(22) Filed: Apr. 24, 2014

(65) Prior Publication Data

US 2015/0310047 A1 Oct. 29, 2015

(51) Int. Cl.
*G06F 17/30* (2006.01)
(52) U.S. Cl.
CPC .............................. *G06F 17/30333* (2013.01)
(58) Field of Classification Search
None
See application file for complete search history.

(56) References Cited

U.S. PATENT DOCUMENTS 5,752,243 A * 5/1998 Reiter ............... G06F 17/30327
2007/0156634 A1 * 7/2007 Martin ............... G06F 17/30592

OTHER PUBLICATIONS

George, L., "HBase: The Definitive Guide." O'Reilly Media, Inc., 2011, Oct. 2, 2013, 554 pages.
Russakovsky, A., "Hopping over Big Data: Accelerating Ad-hoc OLAP Queries with Grasshopper Algorithms." arXiv preprint arXiv:1310.0141, 2013, Sep. 2011, 26 pages.

* cited by examiner

*Primary Examiner* — Amresh Singh
(74) *Attorney, Agent, or Firm* — Slater Matsil, LLP

(57) ABSTRACT

Embodiments are provided for composing multidimensional keys for data blocks organized according to space filling curve approaches in database systems. An embodiment method includes organizing multidimensional data in a storage using a space filling curve algorithm. A plurality of data access paths for allowing access to the data are generated in a hierarchical index topology including an intermediate index page and a plurality of leaf pages. A plurality of odometer-type keys, which point to corresponding data blocks of the multidimensional data in the storage, are digitally composed in the leaf pages using bit clustering in a dimension-by-dimension manner of the multidimensional data. The odometer-type keys have numerical values that determine access to the data blocks according to the space filling curve algorithm. The composition of the odometer-type keys is independent of the numerical values of the odometer-type keys.

17 Claims, 3 Drawing Sheets

SYSTEM AND METHOD FOR COMPOSING A MULTIDIMENSIONAL INDEX KEY IN DATA BLOCKS

TECHNICAL FIELD

The present invention relates to database processing, and, in particular embodiments, to a system and method to compose multidimensional index keys in the data blocks.

BACKGROUND

On modern computer architectures, the scan-based data access approach is gaining more popularity with the increasing hardware capabilities in the areas of instruction-level processing parallelism, hierarchy of data caches for memory accesses and memory address translations (TLB), and of instruction caches. This popularity has given rise to new database technologies such as columnar data store and vector processing engines. On the other hand, traditional indexing technologies still remain as powerful data-pruning mechanisms on index organized data sets. Realizing the powers of both technologies within their respective suitable zones to work efficiently, technologies that mix the two technologies are starting to appear. There is a need for an approach that allows efficient data scans while maintaining the efficiency of indexed lookups.

SUMMARY OF THE INVENTION

In accordance with an embodiment, a method performed by a processing device for organizing data access includes organizing multidimensional data in a storage using a space filling curve algorithm, and generating a plurality of data access paths in a hierarchical index topology including an intermediate index page and a plurality of leaf pages. The method further includes digitally composing odometer-type keys in the leaf pages using bit clustering in a dimension-by-dimension manner of the multidimensional data. The odometer-type keys point to corresponding data blocks of the multidimensional data in the storage.

In accordance with another embodiment, a method performed by a processing device for data access includes receiving a key associated with a data block. The data block is part of multidimensional data stored in a storage. The method further includes looking up, using index based search in one or more non-leaf index pages in a plurality of data access paths, a multidimensional key that matches the key associated with the data block. The data access paths include a plurality of leaf nodes linked to the one or more non-leaf index pages. Further, the method comprises looking up, using index based search, in one of the leaf nodes associated with the multidimensional key, an odometer-type key that matches the key associated with the data block. The odometer-type key is digitally composed using bit clustering in a dimension-by-dimension manner from the multidimensional data.

In accordance with yet another embodiment, a processing device for database access comprises a processor and a non-transitory computer readable storage medium storing programming for execution by the processor. The programming includes instructions to organize multidimensional data in a storage using a space filling curve algorithm, and generate a plurality of data access paths in a hierarchical index topology including an intermediate index page and a plurality of leaf pages. The programming further includes instructions to digitally compose odometer-type keys in the leaf pages using bit clustering in a dimension-by-dimension manner of the multidimensional data. The odometer-type keys point to corresponding data blocks of the multidimensional data in the storage.

The foregoing has outlined rather broadly the features of an embodiment of the present invention in the order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In data warehouse (for database systems), data dimensions are the data used collectively to describe each detail record that, in turn, is part of a set of "fact data". In multi-dimensional functional domains, various "space filling curve" approaches have been used to index and organize the data so as to preserve data spatial proximity in a multi-dimensional domain after mapping into a one-dimensional domain. Each dimensional-domain represents a functionally independent business domain. In contrast, a "fact table" contains individual detail records that are determined by one or many dimensional domains. For example, a fact table of "sales records" is determined by dimensions of time, customer, store, product . . . and contains as detail records of sale-specific metrics such as discount, and quantities, and possibly other relevant data items or information. The multiple dimensions of the data correspond to the multiple elements of a data record (e.g., time, customer, store . . . in the case of a sales record). A "space filling curve" approach is used to determine a traversal ordering among different dimensions to scan the fact data sequentially. Many types of space filling curves exist. Ad-hoc queries across all dimensions may be desired to achieve maximum fairness among the dimensions when using a multidimensional key to access index organized fact data. However, in the case of using a spacing filling curve and its key composition, meeting the "fairness requirement" may not be efficient for processing on modern computer architecture.

Figure 1:
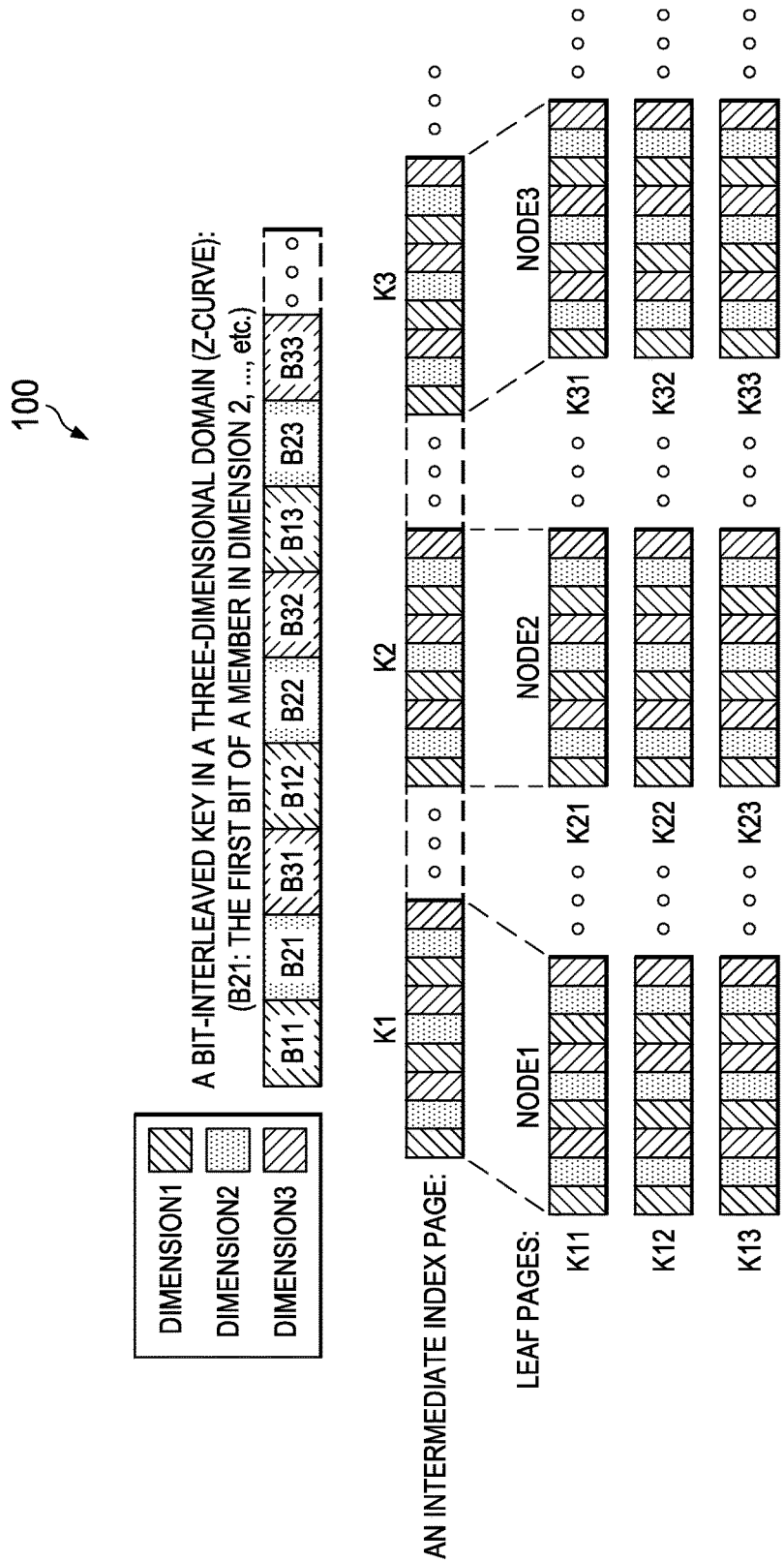
FIG. 1 illustrates an example of data access paths to data organized by bit-interleaved multidimensional keys.

One example of such a "fair" space filling curve approaches is the Z-curve approach. The Z-curve indexing approach is based on bit interleaving among different dimensions. FIG. 1 shows an example of data access paths using bit-interleaved keys (i.e., using the Z-curve) among three different dimensions of a database. The data access paths include intermediate index (key) pages and leaf pages.

An intermediate index page includes multiple keys each pointing to a sub-level node in the data access paths. Each key of the intermediate index page is digitally composed (e.g., bit-wise or numerically generated) according to the defined sequence of a space filling curve (e.g., Z-curve sequence). For example, index keys, k1, k2, k3, . . . include the bits b11, b21, b31, b12, b22, b32, . . . , where b11 is the first bit of a member key from the first dimension, b21 is the first bit of a member key from the second dimension, b31 is the first bit of a member key from the third dimension, b12 is the second bit of the same member key in the first dimension, . . . , etc.

Each leaf page of data also comprises a plurality of index keys and data blocks, or pointers to the data blocks, in the pages. For example, leaf node 1 includes the keys k11, k12, and k13, leaf node 2 includes the keys k21, k22, and k23, and leaf node 3 includes the keys k31, k32, and k33. The data is organized as data blocks according to the space filling curve and indexed by the keys of the leaf nodes. The keys are also digitally composed or generated according to the space filling curve (e.g., the Z-curve) similar to the keys in the intermediate index page.

Using the scheme above for a dimension-based query on a one-dimensional predicate in a 2-dimensional functional domain, for example, may waste half of memory capacity for fetching 50% unused data. For functional domains of high dimensionalities the waste could become more significant. Embodiments are provided herein for composing a multidimensional key for data blocks organized according to space filling curve approaches. The proposed scheme can improve data scan access performance with little impact on indexed access performance and conciliates the advantages of both indexing and scanning technologies. According to the scheme, the multi-dimensional keys are composed differently in different locations of the data access paths.

Specifically, in non-leaf nodes (intermediate index pages) along the data access paths, the multidimensional keys are composed as usual according to a space filling curve algorithm, e.g., the Z-curve approach, which improves the point and range lookups (for keys) within such pages. Examples of the non-leaf points along the data access paths (non-leaf pages) are non-leaf B-Tree nodes and index blocks in HFiles of the Apache Hbase™ NOSQL database system. One rationale for using the space filling curve technique for generating the keys of the non-leaf points is that the accesses to those non-leaf points are often lookups and not scans. In the leaf data blocks, the multidimensional keys are composed in a dimension-by-dimension bit clustered manner, as described below. However, the data in the leaf pages are still digitally organized in the same way as usual and following the same ordering of the chosen space curve filling algorithm. As such, for the leaf pages, the digital multidimensional key composition becomes separated from the data organization, unlike the approach in FIG. 1 where the digital key composition at the leaf pages directly reflects the numerical value represented by the key and used for organizing the data. The multidimensional keys composed in a dimension-by-dimension bit clustered manner are referred to herein as "odometer-type" multidimensional keys. Leaf data pages that have the odometer-type key compositions can be efficiently scanned along their dimensional boundaries.

Figure 2:
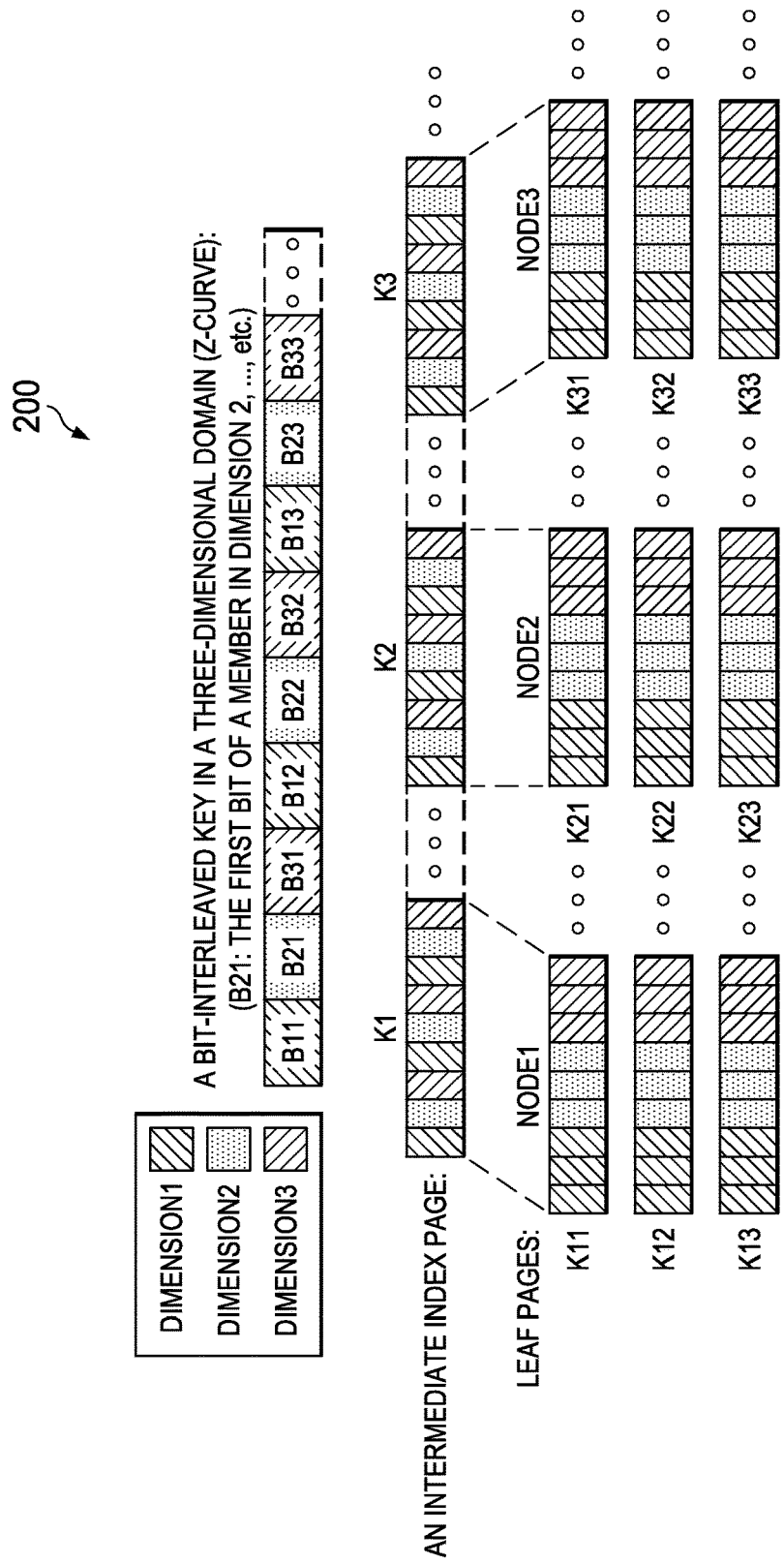
FIG. 2 illustrates an embodiment of data access paths to the data organized as in FIG. 1 but with a different key composition of dimension-wise bit clustered components.

FIG. 2 shows an embodiment of data access paths according to the proposed multidimensional key composition scheme. The data is the same 3-dimensional data of FIG. 1. Each key of the intermediate index pages of the indexing tree is composed by interleaving bits from the different dimensions according to the Z-curve algorithm. For instance, the keys shown (k1, k2, and k3) are composed similar to the respective keys in FIG. 1. However, each multidimensional key of the leaf pages is an odometer-type key composed by grouping member key bits in a dimension-by-dimension manner without interleaving between the dimensions. For example, leaf node 1 includes the keys k11 where the first 3 bits are from member keys in the first dimension, the second 3 bits are from member keys in the second dimension, and the third 3 bits are from member keys in the second dimension. Thus, the bits of each dimension are grouped together in the odometer-type key. The remaining odometer-type keys in the leaf nodes are obtained similarly, although the bits obtained from the different dimensions differ from key to key to ensure the uniqueness of the odometer-type keys.

The scheme above provides efficient scan of data blocks for queries on dimensional predicates. The scheme also allows for easier and more natural decomposition of the multidimensional keys along their dimensional boundaries so they can be more efficiently stored, compressed, and processed. This is suitable for a columnar storage of the keys. For example, data tables are stored as sections of columns of data rather than as rows of data. Columnar data storage is known to be suitable for CPU-efficient processing models such as vector processing, and in better and more efficient compression. The scheme can make use of the advantages of both data pruning techniques (in the form of multidimensional indexing) and processing capabilities of modern hardware without using an empirical cost model.

Figure 3:
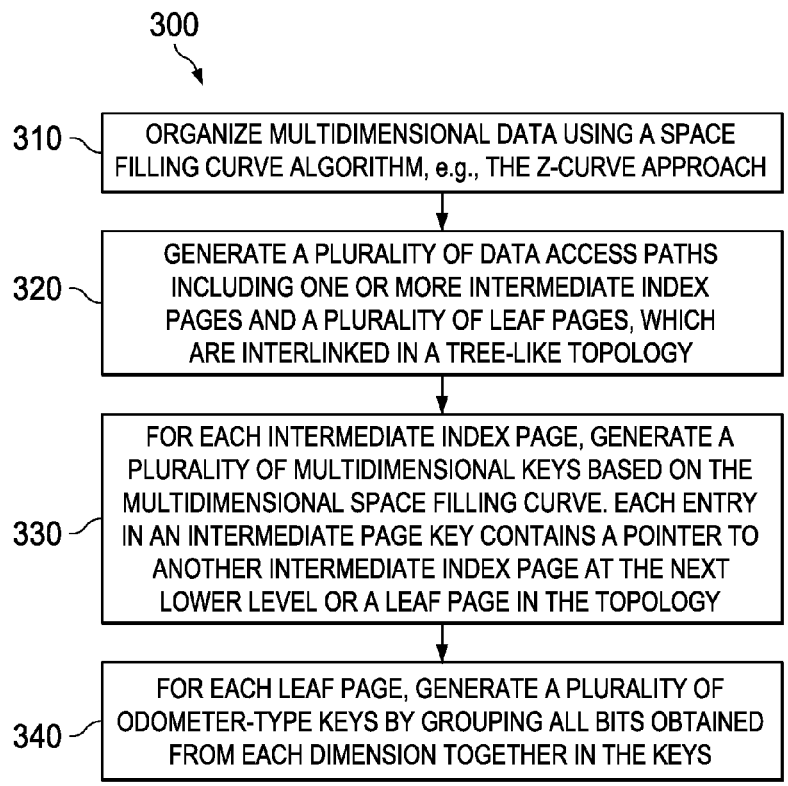
FIG. 3 illustrates an embodiment method for generating organized data access using keys from a space filling curve algorithm.

FIG. 3 shows an embodiment method 300 for data organizing and multidimensional, odometer-typed digital key generation according to a space filling curve. At step 310, multidimensional data is organized, in a memory or persistent data storage, using a space filling curve algorithm, e.g., the Z-curve approach. At step 320, a plurality of data access paths are generated, including one or more intermediate index pages and a plurality of leaf pages, which are inter-linked in a tree like topology. At step 330, for each intermediate index page, a plurality of multidimensional keys are generated using bit interleaving between the data dimensions based on the space filling curve key composition, e.g., as shown in FIG. 2. Each key points to a sub-intermediate index page or a leaf page in the topology. At step 340, for each leaf page, a plurality of odometer-type keys are generated using bit clustering in a dimension-by-dimension manner without interleaving between the dimensions, e.g., as shown in FIG. 2. The resulting odometer-type keys still point to corresponding data blocks that are organized based on the space filling curve. This is possible since this digital multidimensional key composition at the leaf nodes is independent of the key values that point to the data blocks. In other words, although the keys are generated without the bit interleaving between dimensions, their resulting key values still match the space filling curve organization of the data.

Figure 4:
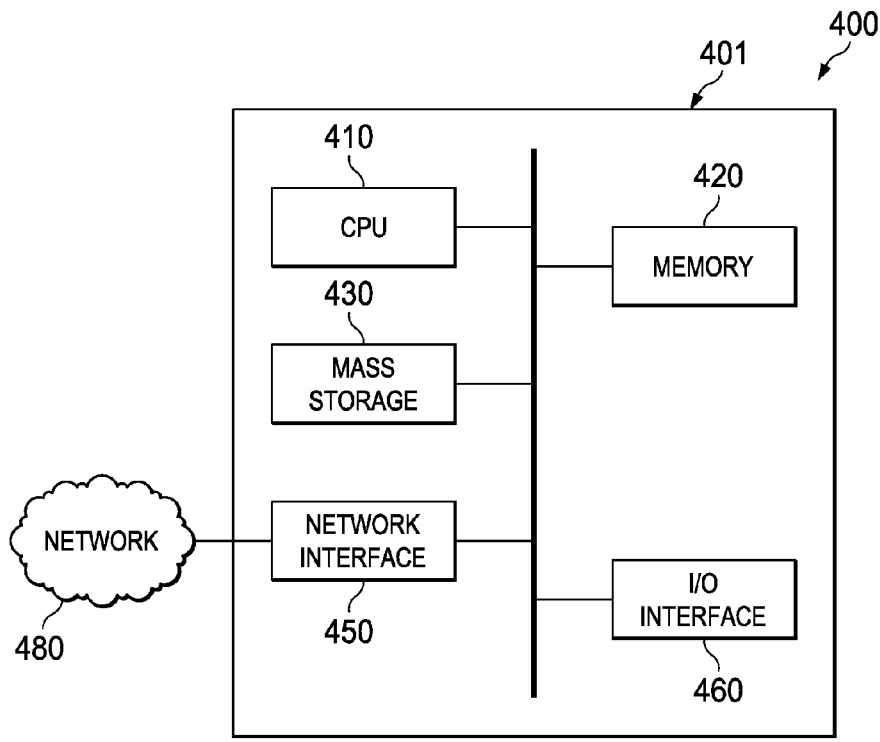
FIG. 4 is a diagram of a processing system that can be used to implement various embodiments.

FIG. 4 is a block diagram of a processing system 400 that can be used to implement various embodiments, such as for implementing the scheme 200 and the method 300. The processing system 400 can be part of any suitable processing device, such as a database central or distributed server, a computer device, or other suitable devices with data processing capability. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral bus or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. In some embodiments, the mass storage device 430 or a second mass storage device may be external to the processing unit 401 and may be collocated or remotely accessed via a network (e.g., network 480). The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a processing device for organizing data access, the method comprising:
   organizing, by the processing device, multidimensional data in a database storage using a space filling curve algorithm, wherein the multidimensional data comprises a plurality of data records comprising multiple data items, wherein the data items represent multiple dimensions of the multidimensional data;
   generating, by the processing device, a plurality of data access paths in a hierarchical index topology including an intermediate index page and a plurality of leaf pages;
   generating, in the intermediate index page, a plurality of multidimensional keys using a bit sequence between the multiple dimensions of the multidimensional data and determined according to the space filling curve algorithm, one or more of the multidimensional keys pointing to one or more leaf pages of the plurality of leaf pages;
   digitally composing, by the processing device, odometer-type keys in the leaf pages using bit clustering in a dimension-by-dimension manner of the multidimensional data, wherein digitally composing the odometer-type keys comprises grouping bits of member keys of the multiple dimensions of the multidimensional data separately without interleaving or mixing bits of the member keys between dimensions of the multidimensional data, and wherein the odometer-type keys point to corresponding data blocks of the multidimensional data in the database storage; and
   storing, by the processing device in the database storage, the multidimensional keys in the intermediate index page and the odometer-type keys in the leaf pages.

2. The method of claim 1, wherein the odometer-type keys have numerical values that indicate access to the data blocks according to the space filling curve algorithm, and wherein the odometer-type keys are digitally composed independent of the numerical values of the odometer-type keys.

3. The method of claim 1, wherein the database storage is a volatile memory or a persistent data storage.

4. The method of claim 1, further comprising:
   receiving a key associated with a data block of the data blocks;
   looking up, using index based searching in a non-leaf index page of the hierarchical index topology, a multidimensional key matching a key associated with the data block; and
   looking up, using index based searching, a second odometer-type key matching the key.

5. The method of claim 4, further comprising accessing, in the database storage, the data block with the second odometer-type key that matches the key associated with the data block, wherein the second odometer-type key points to the data block in the database storage.

6. The method of claim 1, comprising generating the multidimensional keys using the bit sequence between the multiple dimensions comprises selections of various portions of member keys in the multiple dimensions of the multidimensional data.

7. A method performed by a processing device for data access, the method comprising:
   receiving, by the processing device, a key associated with a data block, wherein the data block is part of multidimensional data stored in a database storage, wherein the multidimensional data comprises a plurality of data records comprising multiple data items, wherein the data items represent multiple dimensions of the multidimensional data;
   looking up, by the processing device using index-based searching in one or more non-leaf index pages in a plurality of data access paths stored in the database storage, a multidimensional key that matches the key associated with the data block, wherein the data access paths include a plurality of leaf nodes linked to the one or more non-leaf index pages, wherein the multidimensional key is generated using a bit sequence between the multiple dimensions of the multidimensional data and determined according to a space filling curve algorithm used to organize the multidimensional data, the multidimensional key stored in an intermediate index page corresponding to the one or more non-leaf index pages of the data access paths; and
   looking up, by the processing device using index-based searching, in one of the leaf nodes associated with the multidimensional key, an odometer-type key that matches the key associated with the data block, wherein the odometer-type key is digitally composed using bit clustering in a dimension-by-dimension manner from the multidimensional data by grouping bits of member keys of the multiple dimensions of the multidimensional data separately without interleaving or mixing bits of the member keys between dimensions of the multidimensional data.

8. The method of claim 7, wherein the odometer-type key has a numerical value that indicates access to the data block according to a space filling curve algorithm, and wherein the odometer-type key is digitally composed independent of the numerical value of the odometer-type key.

9. The method of claim 7, further comprising accessing, in the database storage, the data block with the odometer-type key that matches the key associated with the data block, wherein the odometer-type key points to the data block in the database storage.

10. The method of claim 7, wherein the bit sequence includes bits selected of various portions of member keys in the multiple dimensions of the multidimensional data.

11. The method of claim 7, wherein the database storage is a volatile memory or a persistent data storage.

12. A processing device for database access, comprising:
   a database storage;
   a memory storage comprising instructions; and
   one or more processors in communication with the database storage and the memory, wherein the one or more processors execute the instructions to:
      organize multidimensional data in the database storage using a space filling curve algorithm, wherein the multidimensional data comprises a plurality of data records comprising multiple data items, wherein the data items represent multiple dimensions of the multidimensional data;
      generate a plurality of data access paths in a hierarchical index topology including an intermediate index page and a plurality of leaf pages;
      generate, in the intermediate index page, a plurality of multidimensional keys using a bit sequence between the multiple dimensions of the multidimensional data and determined according to the space filling curve algorithm, one or more of the multidimensional keys pointing to one or more leaf pages of the plurality of leaf pages;
      digitally compose odometer-type keys in the leaf pages using bit clustering in a dimension-by-dimension manner of the multidimensional data, wherein the instructions to digitally compose the odometer-type keys include instructions to group bits of member keys of the multiple dimensions of the multidimensional data separately without interleaving or mixing bits of the member keys between dimensions of the multidimensional data, wherein the odometer-type keys point to corresponding data blocks of the multidimensional data in the database storage; and
      store, in the database storage, the multidimensional keys in the intermediate index page and the odometer-type keys in the leaf pages.

13. The processing device of claim 12, wherein the odometer-type keys map to numerical values that indicate access to the data blocks according to the space filling curve algorithm, and wherein the odometer-type keys are digitally composed independent of the numerical values of the odometer-type keys.

14. The processing device of claim 12, wherein the one or more processors execute the instructions to generate the multidimensional keys using the bit sequence between the multiple dimensions comprises selections of various portions of member keys in the multiple dimensions of the multidimensional data.

15. The processing device of claim 12, wherein the database storage is a volatile memory or a persistent data storage.

16. The processing device of claim 12, wherein the one or more processors execute the instructions to:
   receive a key associated with a data block of the data blocks;
   look up, using index based searching in a non-leaf index page of the hierarchical index topology, a multidimensional key matching a key associated with the data block; and
   look-up, using index based searching, a second odometer-type key matching the key.

17. The processing device of claim 16, wherein the one or more processors execute the instructions to access, in the database storage, the data block with the second odometer-type key that matches the key associated with the data block, wherein the second odometer-type key points to the data block in the database storage.

* * * * *